(12) United States Patent
Hardgrove

(10) Patent No.: US 7,980,022 B1
(45) Date of Patent: Jul. 19, 2011

(54) FISHING LINE SLIDING DEVICE

(76) Inventor: Marvin Hardgrove, North Lawrence, OH (US)

( * ) Notice: Subject to any disclaimer, the term of this patent is extended or adjusted under 35 U.S.C. 154(b) by 488 days.

(21) Appl. No.: 12/196,446

(22) Filed: Aug. 22, 2008

(51) Int. Cl.
*A01K 91/04* (2006.01)

(52) U.S. Cl. .................. 43/44.85; 43/44.88; 43/44.84

(58) Field of Classification Search ............. 43/44.85, 43/44.88, 44.84, 43.13, 44.83, 17.2, 43.1, 43/43.12, 44.87, 44.95
See application file for complete search history.

(56) References Cited

U.S. PATENT DOCUMENTS

| | | | |
|---|---|---|---|
| 3,959,913 A | 6/1976 | Weber | |
| 4,205,478 A * | 6/1980 | Emory | 43/44.85 |
| 4,221,068 A | 9/1980 | Roemer, Jr. | |
| 4,453,336 A | 6/1984 | Lowden | |
| 4,494,334 A * | 1/1985 | Porter | 43/43.12 |
| 4,520,589 A | 6/1985 | Lummis | |
| 4,530,181 A | 7/1985 | Ender | |
| 4,750,288 A * | 6/1988 | Brennan | 43/43.1 |
| 4,856,224 A * | 8/1989 | Fincher, Sr. | 43/43.12 |
| 5,033,226 A * | 7/1991 | Jackson | 43/43.12 |
| 6,092,326 A * | 7/2000 | Strome | 43/44.88 |
| 6,935,069 B1 * | 8/2005 | Jensen | 43/43.12 |
| 7,117,629 B2 | 10/2006 | Brzozowski | |
| D545,937 S | 7/2007 | Heuke | |
| 2007/0119091 A1 * | 5/2007 | Osborn et al. | 43/43.12 |

* cited by examiner

*Primary Examiner* — Christopher P Ellis

(57) ABSTRACT

The present invention is an improved fishing line with sliding means comprising a curved slider and clip. The invention is designed to be used with a single down rigging and a single fishing line. The invention connects to the single fishing line via the curved slider and clip. The invention is capable of moving up and down the fishing line, and has a separate fishing leader and fishing lure attached via the clip.

5 Claims, 5 Drawing Sheets

FISHING LINE SLIDING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fishing lines, more specifically, a fishing line sliding device for use with multiple fishing lures at various depths.

B. Discussion of the Prior Art

As a preliminary note, it should be stated that there is an ample amount of prior art that deals with fishing lines. As will be discussed immediately below, no prior art discloses an improved fishing line sliding device that enables two or more fishing lures to be included upon a single fishing line at various depths.

The Ender Patent (U.S. Pat. No. 4,530,181) discloses a sliding attachment for a down rigger that allows a second lure to be cast at a different depth simultaneously. However, the fishing line must pass through the device 10 in order for the can be added onto a fishing line without the need for threading the fishing line through small holes.

The Roemer, Jr. Patent (U.S. Pat. No. 4,221,068) discloses a down rigger fishing line assembly that has multiple lines cast at different depths. However, the assembly requires connection with both the down rigger line and the fishing line as opposed to an assembly that is free to move up and down a fishing line by itself.

The Brzozowski Patent (U.S. Pat. No. 7,117,629) discloses a bottom fishing rigger that uses a sliding mechanism. However, the sliding weight does not attach to the fishing line via a clip that also connects to an elongated leader containing the extra fishing lure. Furthermore, the assembly requires stops to prevent movement of the sliding mechanism at specified depths, which is a disadvantage that the current device overcomes.

The Lowden Patent (U.S. Pat. No. 4,453,336) discloses a fishing line, down rigging assembly that has two lures cast at different depths. Again, the line release mechanism attaches directly to the down rigging and not the opposing fishing line. Furthermore, the mechanism requires a separate fishing line for each fishing lure.

The Weber Patent (U.S. Pat. No. 3,959,913) discloses an attachment for fishing down riggers that allows several lures to be cast at differing depths simultaneously. The attachment of the Weber Patent requires attachment with the down rigger, and not with a single fishing line.

The Lummis Patent (U.S. Pat. No. 4,520,589) discloses a lock and release mechanism for a down rigger fishing assembly that has three fishing lures at different depths. The lock and release mechanism is designed to lock in place on the fishing rigger as opposed to a sliding mechanism that attaches to a fishing line.

While the above-described devices fulfill their respective and particular objects and requirements, they do not describe an improved fishing line with sliding means that provides for the advantages of the improved fishing line with sliding means. In this regard, the improved fishing line with sliding means departs from the conventional concepts and designs of the prior art.

SUMMARY OF THE INVENTION

The present invention is an improved fishing line with sliding means comprising a curved slider and clip. The invention is designed to be used with a single down rigging and a single fishing line. The invention connects to the single fishing line via the curved slider and clip. The invention is capable of moving up and down the fishing line, and has a separate fishing leader and fishing lure attached via the clip.

An object of the invention is to provide a device that enables a separate fishing lure to attach to a single fishing line at varying depths.

A further object of the invention is to allow multiple lures to be added onto a single fishing line with each lure at varying depths.

These together with additional objects, features and advantages of the improved fishing line with sliding means will be readily apparent to those of ordinary skill in the art upon reading the following detailed description of presently preferred, but nonetheless illustrative, embodiments of the improved fishing line with sliding means when taken in conjunction with the accompanying drawings.

In this respect, before explaining the current embodiments of the improved fishing line with sliding means in detail, it is to be understood that the improved fishing line with sliding means is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved fishing line with sliding means. It is therefore important that the claims be regarded as including such equivalent construction insofar as they do not depart from the spirit and scope of the improved fishing line with sliding means. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Detailed reference will now be made to the present invention, examples of which are illustrated in FIGS. 1-5. An improved fishing line assembly sliding means 10 (hereinafter invention) includes a curved slider 11 and a clip 21.

The curved slider 11 and the clip 21 are made of a material comprising wood, plastic, metal, or glass.

The curved slider 11 has a shape resembling a "U". However, it shall be noted That the degree of curvature and overall shape shall be considered obvious to one of ordinary skill in the art.

The curved slider 11 has a channel 12 formed along one side of the curved slider 11. It should be noted that the channel 12 shall be smooth in finish in order to enable a fishing line 30 to pass along the channel 12.

Figure 5:
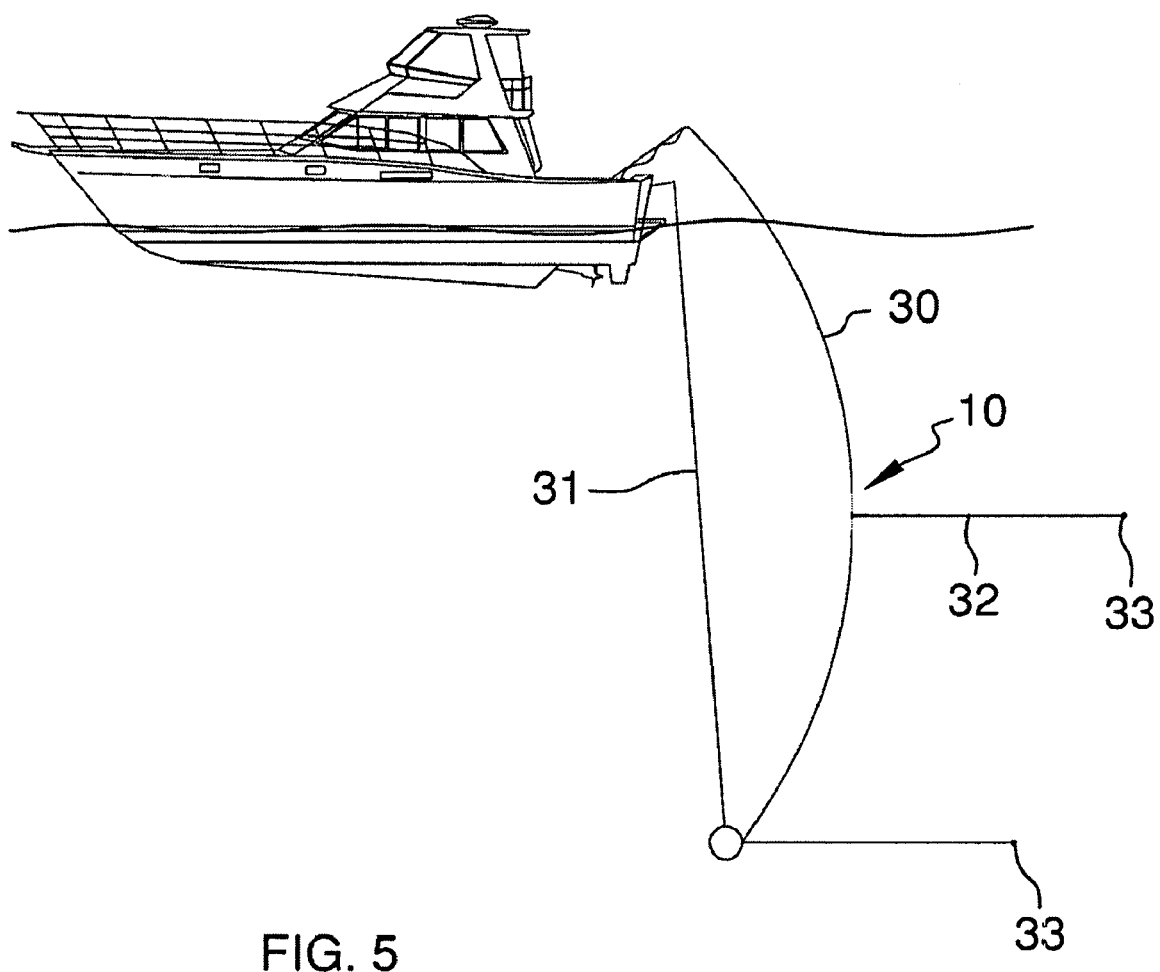
FIG. 5 illustrates the invention in use with a fishing line and down rigging.

It shall be noted that in FIG. 5, the invention 10 is used with said fishing line 30 that connects to a down rigging 31. Said configuration is best suited for use in a deep sea fishing environment or in a deep lake fishing environment. However, the invention 10 may be adapted for use with the single fishing line 30 and no down rigging 31.

Figure 1:
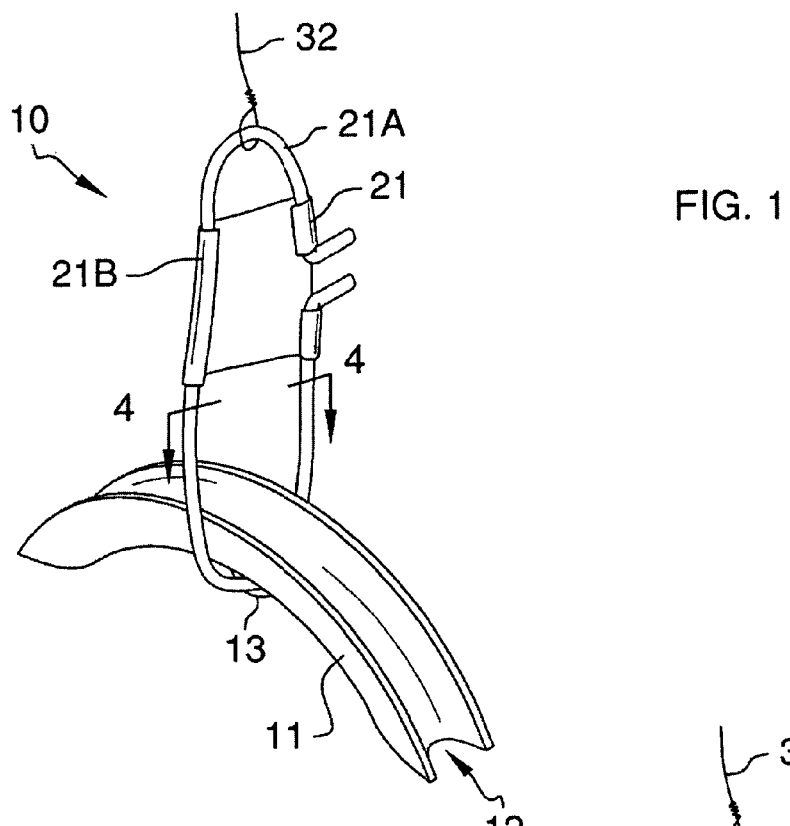
FIG. 1 illustrates a front, isometric view of the curved slider and clip.
Figure 2:
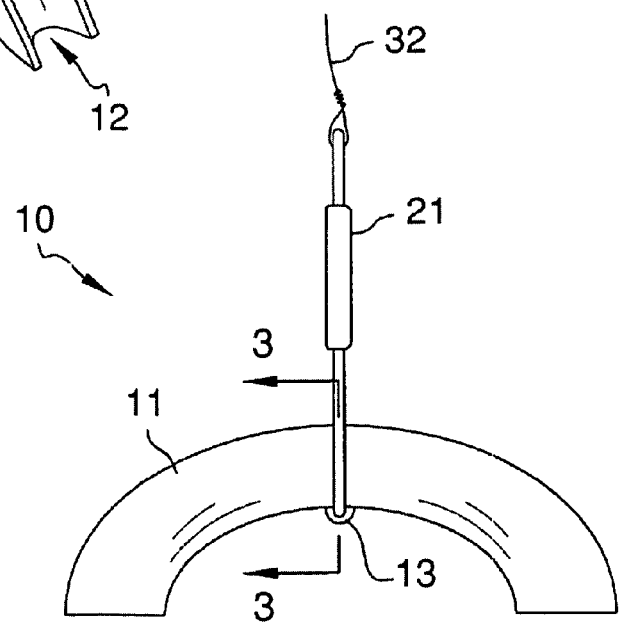
FIG. 2 illustrates a side view of the curved slider and clip.
Figure 3:
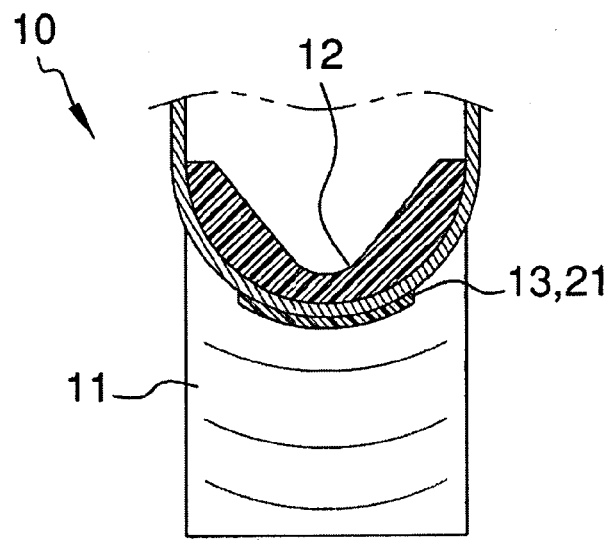
FIG. 3 illustrates a cross-sectional view of the curved slider and clip along line 3-3 in FIG. 2.
Figure 4:
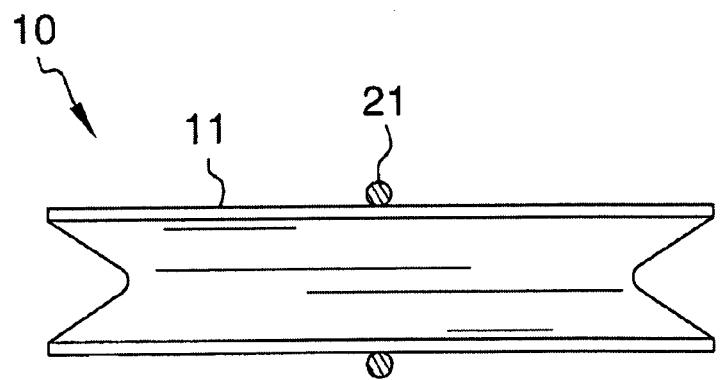
FIG. 4 illustrates a cross-sectional view of the curved slider and clip along line 4-4 in FIG. 1.

Referring to FIGS. 2 and 3, located on an opposing side from the channel 12 is an eyelet 13. The clip 21 passes through the eyelet 13 and is for securing the clip 21 to the curved slider 11. It shall be noted that other securing means may be employed upon the curved slider 11 or the clip 21, in the alternative.

The clip 21 is comprised of a shaped bar piece 21A and a locking piece 21B. It shall be noted that other clip styles may be used and are obvious to a person of ordinary skill in the art.

The clip 21 attaches to a fishing leader 32, which has fishing lure 33 attached at the opposite end.

It is being asserted that a benefit of the invention 10 is that a plurality of the invention 10 may be attached to the single fishing line 30.

Figure 6:
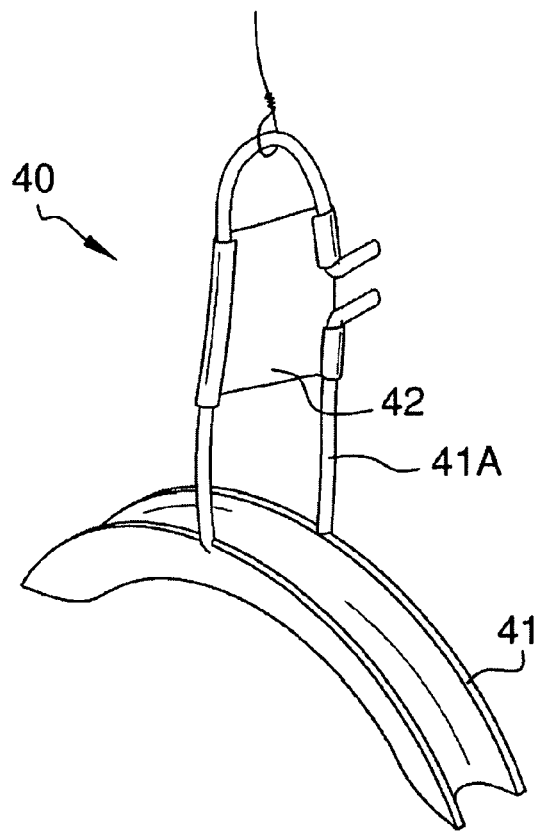
FIG. 6 illustrates an isometric view of an alternative embodiment of the invention.
Figure 7:
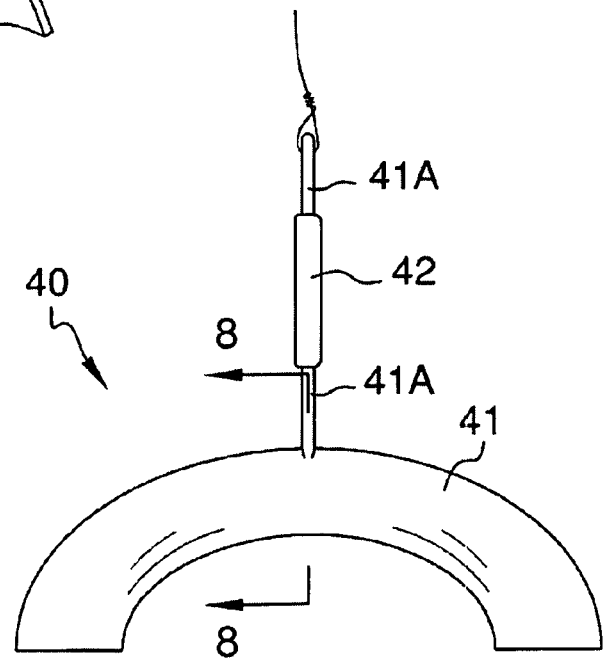
FIG. 7 illustrates a side view of the alternative embodiment.
Figure 8:
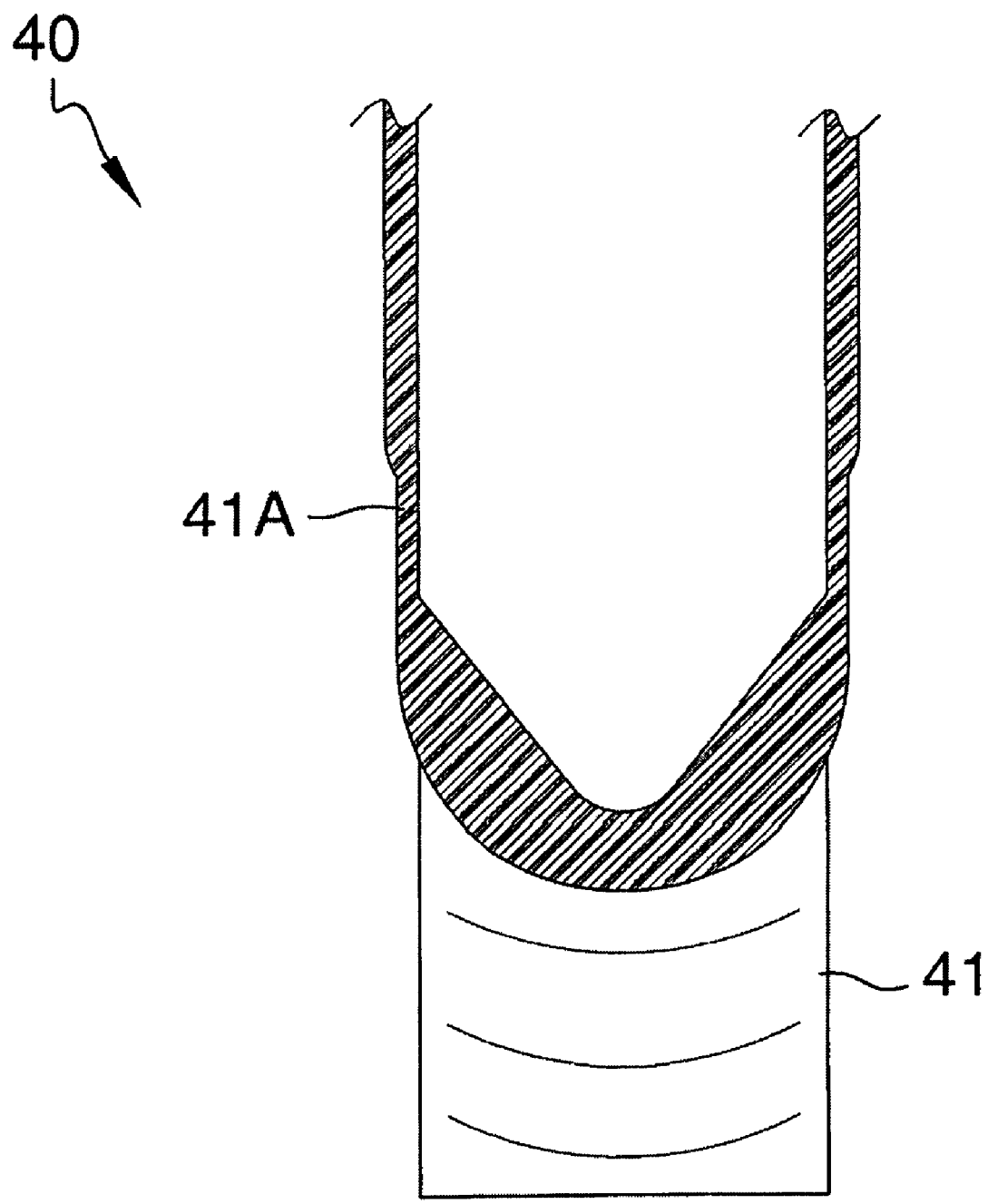
FIG. 8 illustrates a cross-sectional view of the alternative embodiment along line 8-8 in FIG. 7.

Referring to FIGS. 6-8, an alternative embodiment 40 includes a curved slider 41, and clip 42. The curved slider 41 has a shaped bar piece 41A integrated into the design of the curved slider 41 such that the curved bar piece 41A does not rotate with respect to the curved slider 41. The clip 42 is used in the same manner as the clip 21 of the invention 10. The alternative embodiment 40 is used in the same manner as the invention 10.

With respect to the above description, it is to be realized that the optimum dimensional relationship for the various components of the improved fishing line with sliding means, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the improved fishing line with sliding means.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An improved fishing line assembly sliding means comprising:
   (a) a curved slider;
      wherein the curved slider engages an existing fishing line along a curved channel and is capable of sliding along said fishing line to the vertex of said fishing line during trolling;
   (b) a clip;
      wherein the clip attaches to the curved slider via a curved bar piece;
      wherein the clip and curved slider attach around the fishing line and remain secure to the fishing line due to action/reaction forces between said fishing line and said curved slider during trolling; and
      wherein the clip attaches to a separate leader connected to a fishing lure.

2. The improved fishing line assembly sliding means as described in claim 1 wherein the curved slider has a loop on a side opposing the channel wherein the curved bar piece passes there through and thus securing the clip with respect to the curved slider.

3. The improved fishing line assembly sliding means as described in claim 2 wherein the curved slider and the clip are made of a shaped bar piece and corresponding locking piece from material comprising plastic, glass, metal, or a wood.

4. The improved fishing line assembly sliding means described in claim 1 wherein the curved slider and the curved bar piece are molded together as one piece such that the curved bar piece does not rotate with respect to the curved slider.

5. The improved fishing line assembly sliding means claim 4 wherein the curved slider and the clip are made of a shaped bar piece and corresponding locking piece from material comprising plastic, glass, metal, or a wood.

* * * * *